(12) United States Patent
Harrison (10) Patent No.: US 6,750,639 B2
(45) Date of Patent: Jun. 15, 2004

(54) METHOD AND CIRCUIT FOR LIMITING A PUMPED VOLTAGE

(75) Inventor: Ronnie M. Harrison, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/267,225

(22) Filed: Oct. 8, 2002

(65) Prior Publication Data

US 2003/0098676 A1 May 29, 2003

Related U.S. Application Data

(62) Division of application No. 09/996,452, filed on Nov. 28, 2001.

(51) Int. Cl.[7] .................................................. G05F 1/40
(52) U.S. Cl. ........................ 323/281; 323/288; 323/284
(58) Field of Search ................................. 323/281, 282, 323/284, 288

(56) References Cited

U.S. PATENT DOCUMENTS

| 5,327,026 | A | * | 7/1994 | Hardee et al. ................. 326/88 |
| 5,694,035 | A | * | 12/1997 | Keeth .......................... 323/349 |
| 5,698,972 | A | | 12/1997 | Keeth .......................... 323/349 |
| 5,903,502 | A | * | 5/1999 | Porter .......................... 365/201 |
| 6,018,236 | A | | 1/2000 | Keeth .......................... 323/313 |
| 6,297,624 | B1 | * | 10/2001 | Mitsui et al. ................ 323/316 |
| 6,417,726 | B1 | * | 7/2002 | Kitade .......................... 327/543 |

OTHER PUBLICATIONS

Gregorian, R. et al., "Analog MOS Integrated Circuits for Signal Processing", New York, A Wiley–Interscience Publication, 1986, pp. 146–156.

* cited by examiner

*Primary Examiner*—Bao Q. Vu
(74) *Attorney, Agent, or Firm*—Dorsey & Whitney LLP (57) ABSTRACT

A method and circuit control the value of generated voltage derived from a supply voltage as the value of the supply voltage varies, such as during burn-in of an integrated circuit. A voltage generation circuit includes a generator circuit that receives a supply voltage and has a reference node and develops an output voltage from the supply voltage, the output voltage having a value that is a function of a reference voltage applied on the reference node. A coupling circuit receives the supply voltage and operates in response to a voltage control signal to vary an electronic coupling of the supply voltage to the reference node to thereby adjust the value of the reference voltage. A voltage sensing circuit develops the voltage control signal that is applied to the coupling circuit in response to the reference voltage.

36 Claims, 5 Drawing Sheets

METHOD AND CIRCUIT FOR LIMITING A PUMPED VOLTAGE

CROSS-REFERENCE TO RELATED APPLICATION

This application is a divisional of pending U.S. patent application Ser. No. 09/996,452, filed Nov. 28, 2001.

TECHNICAL FIELD

The present invention relates generally to voltage generation circuits, and, more particularly, to controlling the voltage developed by a voltage generation circuit.

BACKGROUND OF THE INVENTION

Voltage generation circuits are utilized in many integrated circuits to generate voltages required for proper operation of the integrated circuit. For example, in a semiconductor memory device such as a dynamic random access memory (DRAM) a supply voltage VCC is applied to the device and a voltage generation circuit within the memory device generates a pumped voltage VCCP having a value greater than the supply voltage. In a DRAM, the pumped voltage VCCP is utilized, for example, in driving word lines of a memory-cell array when accessing rows of memory cells contained in the array, as will be appreciated by those skilled in the art. The value of the pumped voltage VCCP is greater than the supply voltage VCC so that capacitors in the memory cells may be charged to the supply voltage, as will once again be understood by those skilled in the art.

Figure 1:
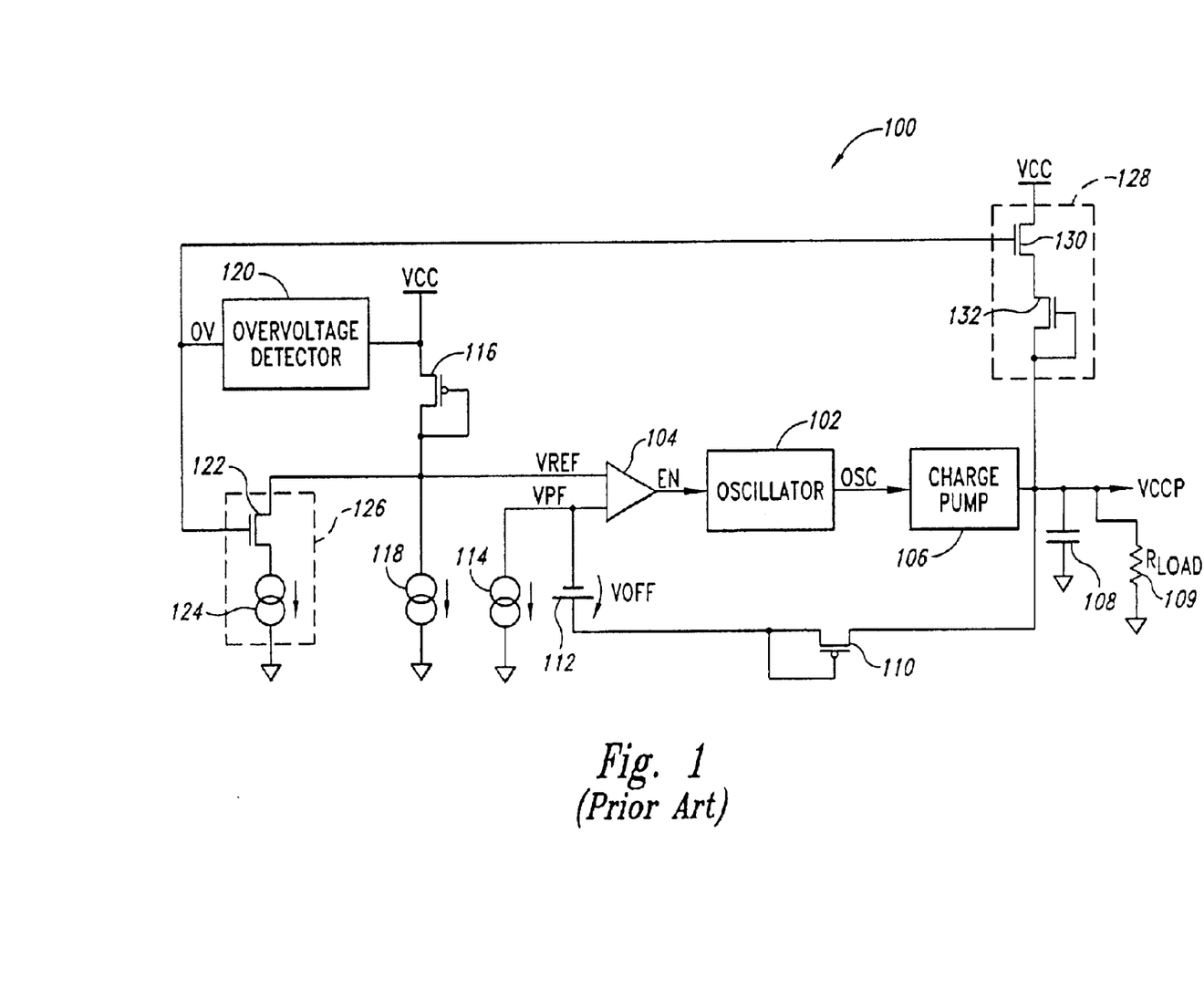
FIG. 1 is a functional block diagram and schematic illustrating a conventional voltage generation circuit.

FIG. 1 is a functional block diagram and schematic illustrating a conventional voltage generation circuit 100 that may be utilized in a DRAM to generate a pumped voltage VCCP having a value greater than an applied supply voltage VCC. The voltage generation circuit 100 includes an oscillator 102 that generates an oscillator signal OSC in response to an enable signal EN applied by a Schmitt Trigger comparator 104. The oscillator 102 clocks the OSC signal when the EN signal is active and does not clock the OSC signal when the EN signal is inactive, instead maintaining the OSC signal either high or low. The OSC signal is applied to clock a charge pump circuit 106 which, in response to the OSC signal, generates the pumped voltage VCCP. More specifically, when the OSC signal clocks the charge pump circuit 106, the circuit turns ON and charges a load capacitor 108 to thereby develop the pumped voltage VCCP and drive a load resistance 109. When the OSC signal does not clock the charge pump circuit 106, the circuit turns OFF and stops charging the load capacitor 108. The detailed operation and circuitry for forming the oscillator 102 and charge pump circuit 106 are well understood by those skilled in the art, and thus, for the sake of brevity, these components will not be described in further detail.

The pumped voltage VCCP is applied through a diode-coupled PMOS transistor 110 and a level shifting circuit 112 to develop a pump feedback voltage VPF that is applied to a first input of the Schmitt Trigger comparator 104. The diode-coupled transistor 110 functions as a level shifter to reduce the value of the pumped voltage VCCP and ensure proper common-mode operation of the Schmitt Trigger comparator 104, as will be appreciated by those skilled in the art. The level shifting circuit 112 reduces the voltage from the diode-coupled transistor 110 by an offset voltage VOFF, which has a value determined, in part, by the desired value of the pump feedback voltage VPF. A current source 114 causes a desired current to flow through the diode-coupled transistor 110 and level shifting circuit 112 so that the feedback voltage VPF having the desired value is developed on the first input of the Schmitt Trigger comparator 104. A second input of the Schmitt Trigger comparator 104 receives a reference voltage VREF that is developed by a diode-coupled PMOS transistor 116 and a current source 118 coupled in series between the supply voltage VCC and ground. The diode-coupled transistor 116 functions as a level shifter to reduce the value of the supply voltage VCC and provide for proper common mode operation of the Schmitt Trigger comparator 104, as will be appreciated by those skilled in the art. The current source 118 causes a desired current to flow through the diode-coupled transistor 116 to develop the reference voltage VREF on the second input of the Schmitt Trigger comparator 104.

The voltage generation circuit 100 further includes over voltage protection components that attempt to limit the value of the pumped voltage VCCP as the supply voltage VCC increases. The overvoltage protection components include an overvoltage detector 120 that monitors the supply voltage VCC and develops an overvoltage signal OV having a value that is a function of the monitored supply voltage. The overvoltage signal OV is applied to an NMOS transistor 122 that is connected in series with a current source 124 and coupled between the second input of the Schmitt Trigger comparator 104 and ground. When the overvoltage signal OV has a sufficient magnitude, the transistor 122 turns ON causing current to flow through the transistor and current source 124 to ground. The transistor 122 and current source 124 together form a current limiting circuit 126 that operates during an overvoltage mode of the circuit 100, as will be described in more detail below. The overvoltage signal OV is further applied to a voltage clamping circuit 128 formed by an NMOS transistor 130 and diode-coupled transistor 132 coupled between the output of the charge pump 106 and the supply voltage VCC. When the overvoltage signal OV as a sufficient magnitude, the transistor 130 turns ON allowing current to flow through the diode-coupled transistor 132 and transistor to the supply voltage VCC to thereby clamp the pumped voltage VCCP.

During normal operation of the voltage generation circuit 100, the supply voltage VCC has a predetermined value and the overvoltage detector 120 drives the overvoltage signal OV sufficiently low to turn OFF the transistors 122 and 130. Thus, during normal operation the current limiting circuit 126 and clamping circuit 128 do not affect operation of the voltage generation circuit 100. In operation, the oscillator 102 applies the OSC signal to clock the charge pump 106 which, in turn, develops the pumped voltage VCCP. The pumped voltage VCCP is fed back through the diode-coupled transistor 110 and level shifting circuit 112 to develop the pump feedback voltage VPF. At this point, the current flowing through the diode-coupled transistor 116 as determined by the current source 118 develops the reference voltage VREF. As long as the pump feedback voltage VPF is less than the reference voltage VREF, the comparator drives the EN signal active, causing the oscillator 102 to clock the charge pump 106.

As the charge pump 106 operates, the pumped voltage VCCP increases to a point where the pumped voltage fed back through the diode-coupled transistor 110 and level shifting circuit 112 causes the pump feedback voltage VPF to exceed the reference voltage VREF. When the pump feedback voltage VPF is greater than the reference voltage VREF, the Schmitt Trigger comparator 104 deactivates the EN signal causing the oscillator 102 to stop clocking the charge pump 106 which, in turn, turns OFF. The charge pump 106 remains OFF until the pumped voltage VCCP discharges through a load resistance 109 and drops to a value causing the pump feedback voltage VPF to once again become less than the reference voltage VREF. When this occurs, the Schmitt Trigger comparator 104 once again activates the EN signal causing the oscillator 102 to clock the charge pump 106, which turns ON to once again begin charging the pumped output voltage VCCP.

When the supply voltage VCC increases, the overvoltage detector 120, current limiting circuit 126, and clamping circuit 128 operate in combination to limit the value of the pumped voltage VCCP. As the supply voltage VCC increases, the reference voltage VREF likewise increases, meaning that the pumped voltage VCCP similarly increases to thereby increase the feedback voltage VPF until it equals the increased reference voltage. When the supply voltage VCC exceeds a predetermined value, the overvoltage detector 120 activates the overvoltage signal OV, turning ON the transistors 122 and 130. When the transistor 130 turns ON, the pumped voltage VCCP is limited to a value above the supply voltage VCC determined by a small voltage drop across the transistor 130 plus the voltage drop across the diode-coupled transistor 132. Similarly, the turned ON transistor 122 and current source 124 attempt to sink current in parallel with the current source 118 to increase the voltage across transistor 116 and thereby limit the increase in the value of the reference voltage VREF. Ideally, the reference voltage VREF tracks the supply voltage VCC until the supply voltage exceeds the predetermined value which activates the overvoltage detector 120. This maintains a constant difference between the supply voltage VCC and the pumped voltage VCCP until the supply voltage exceeds the predetermined value. Ideally, once the supply voltage VCC exceeds the predetermined value, the reference voltage VREF is held constant, causing the pumped feedback voltage VPF to become greater than the reference voltage, which causes the Schmitt Trigger comparator 104 to deactivate the EN signal to thereby deactivate the oscillator 102 and turn OFF the charge pump 106. As will now be explained in more detail, the voltage generation circuit 100 does not, however, operate in this ideal manner.

Figure 2:
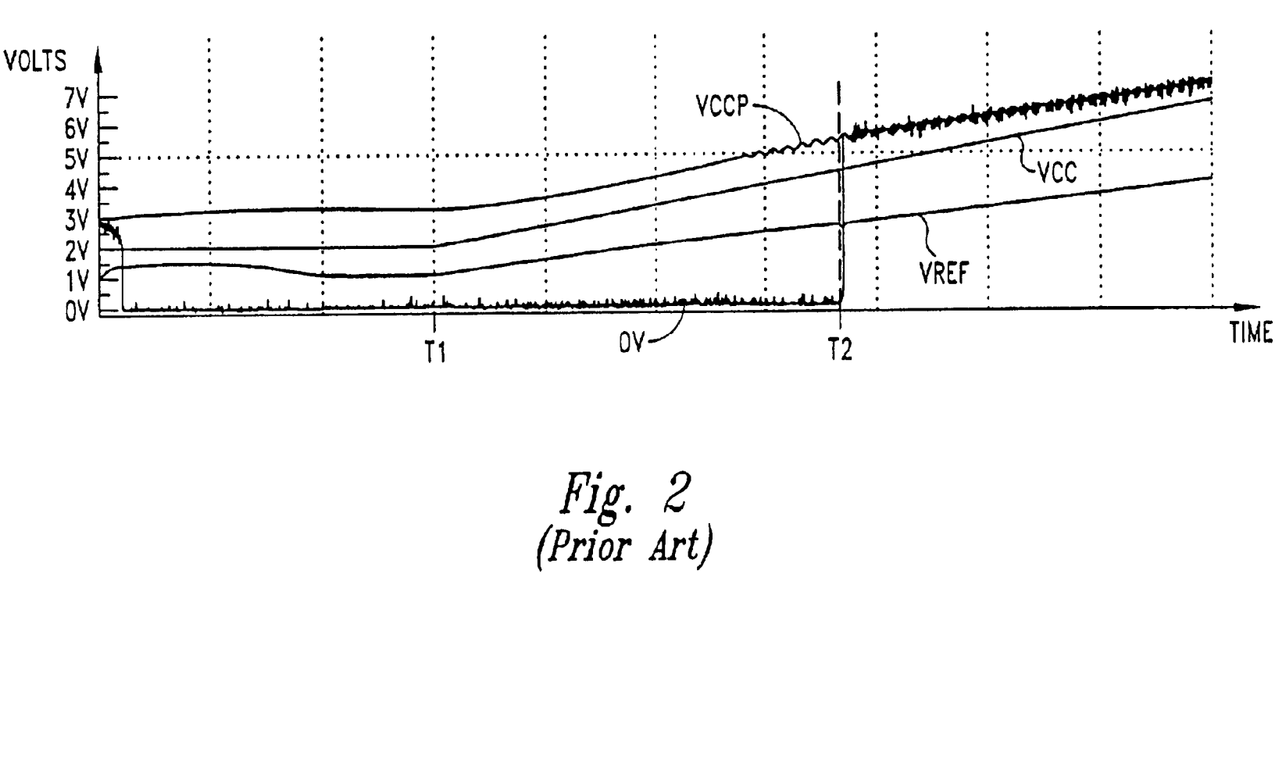
FIG. 2 is a graph illustrating the effect of an increasing supply voltage on an output voltage and several other signals in the voltage generation circuit of FIG. 1.

The supply voltage VCC may increase, for example, during burn-in of an integrated circuit containing the voltage generation circuit 100. Typically, during burn-in the supply voltage VCC is increased to stress components contained within the integrated circuit, as will be understood by those skilled in the art. FIG. 2 is a graph illustrating the values of the pumped voltage VCCP, reference voltage VREF, and the overvoltage signal OV in the voltage generation circuit 100 as the supply voltage VCC increases. In the example of FIG. 2, the values of the supply voltage VCC and pumped voltage VCCP are initially two and three volts, respectively. At a time T1, the supply voltage VCC begins to increase and the pumped voltage VCCP and reference voltage VREF similarly begin increasing as illustrated. At this point, the overvoltage detector 120 is monitoring the supply voltage VCC but has not activated the overvoltage signal OV. Until a time T2, the reference voltage VREF tracks the supply voltage VCC to maintain a constant difference between the supply voltage and the pumped voltage VCCP. At the time T2, the overvoltage signal OV goes active, turning ON the current limiting circuit 126 and clamping circuit 128. Notwithstanding the activation of the circuits 126, 128, it is seen that the pumped voltage VCCP and the reference voltage VREF continue increasing after the time T2. This is true because due to physical limitations, such as heat dissipation and size limitations when forming components of the current source 124, the current limiting circuit 126 cannot sink enough current to limit the value of the reference voltage VREF as the supply voltage VCC increases. As a result, as the supply voltage VCC increases the pumped voltage VCCP and reference voltage VREF likewise increase.

In the voltage generation circuit 100, the pumped voltage VCCP may become so great as the supply voltage VCC increases that components of the integrated circuit containing the voltage generation circuit may be damaged. For example, the pumped voltage VCCP may exceed the breakdown voltages of various devices such as MOS transistors formed within the integrated circuit. Moreover, it should be noted that the clamping circuit 128 must dissipate what may be significant amounts of power as the pumped voltage VCCP increases and thus the voltage generation circuit 100 consumes wasted power and generates unwanted heat during the burn-in process.

There is a need for a voltage generation circuit that reliably limits the value of the pumped voltage as the supply voltage increases.

SUMMARY OF THE INVENTION

A method and circuit control the value of generated voltage derived from a supply voltage as the value of the supply voltage varies, such as during burn-in of an integrated circuit. According to one aspect of the present invention, a voltage generation circuit includes a generator circuit that receives a supply voltage and has a reference node. The generator circuit develops an output voltage from the supply voltage and the output voltage has a value that is a function of a reference voltage applied on the reference node. A coupling circuit is coupled to the reference node and also receives the supply voltage. The coupling circuit operates in response to a voltage control signal to vary an electronic coupling of the supply voltage to the reference node which thereby adjusts the value of the reference voltage. A voltage sensing circuit receives the reference voltage and develops the voltage control signal that is applied to the coupling circuit in response to the reference voltage. The coupling circuit controls coupling of the supply voltage to the reference node, adjusting the value of the reference voltage to control the output voltage of the voltage generation circuit.

DETAILED DESCRIPTION OF THE INVENTION

Figure 3:
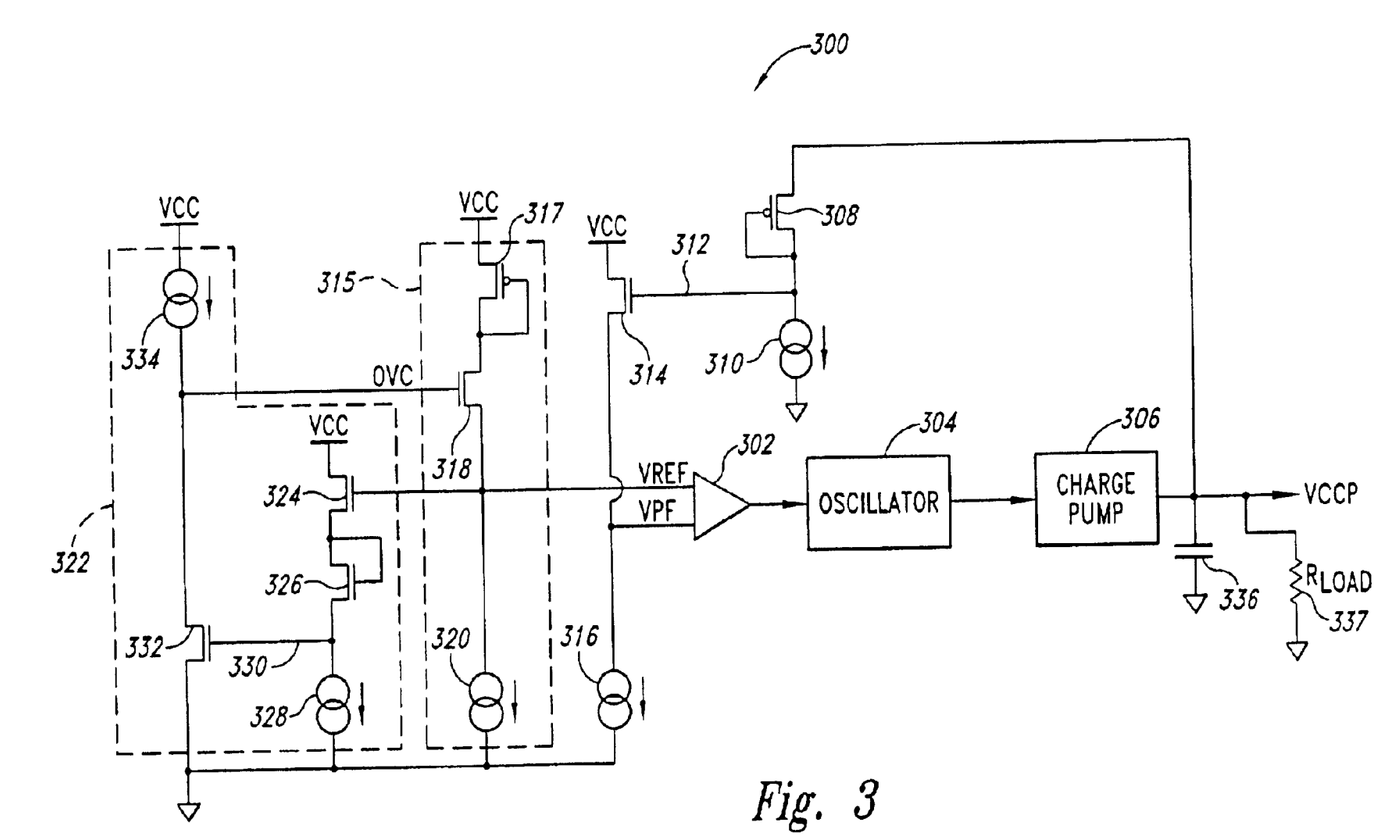
FIG. 3 is a functional block diagram and schematic of a voltage generation circuit according to one embodiment of the present invention.

FIG. 3 is a functional block diagram and schematic of a voltage generation circuit 300 according to one embodiment of the present invention. The voltage generation circuit 300 limits the value of a generated pumped voltage VCCP as an applied supply voltage VCC increases so that components within an integrated circuit containing the voltage generation circuit are not damaged, as will be explained in more detail below. In the following description, certain details are set forth to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

The voltage generation circuit 300 includes a Schmitt Trigger comparator 302, oscillator 304, and charge pump circuit 306, which operate in the same manner as previously described for the corresponding components in the voltage generation circuit 100 of FIG. 1. For the sake of brevity, these components will not again be described in detail. A more detailed description of a charge pump circuit is provided in U.S. Pat. No. 6,160,723 to Liu entitled "Charge Pump Circuit Including Level Shifters for Threshold Voltage Cancellation and Clock Signals Boosting, and Memory Device Using Same," and in U.S. patent application Ser. No. 09/256,972 to Liu entitled "Method and Circuit for Regulating the Output Voltage from a Charge Pump Circuit, and Memory Device Using Same" filed on Feb. 24, 1999, both of which are incorporated herein by reference.

A diode-coupled PMOS transistor 308 and current source 310 develop a control signal 312. The control signal 312 is applied to a gate of an NMOS transistor 314 that is coupled in series with a current source 316 between the supply voltage VCC and ground, and the transistor 314 develops a pump feedback voltage VPF in response to the control signal. The pump feedback voltage VPF is applied to one input of the Schmitt Trigger comparator 302. A coupling circuit 315 is formed by a diode-coupled PMOS transistor 317, an NMOS transistor 318, and a current source 320, which operate in combination to develop a reference voltage VREF in response to an overvoltage control signal OVC, with the reference voltage being applied to a second input of the Schmitt Trigger comparator 302. In response to the OVC signal, the transistor 318 adjusts the current through the diode-coupled transistor 317 to control the value of the reference voltage VREF.

The diode-coupled transistors 308 and 317 are matched, as are the current sources 310 and 320, which provides common-mode level shifting of the pump feedback voltage VPF and reference voltage VREF. In the embodiment of FIG. 3, the transistor 314 is a long-channel device that develops a voltage between control signal 312 and voltage VPF of about 1.5 volts, which determines the difference between the supply voltage VCC and pumped voltage VCCP, as will be appreciated by those skilled in the art.

A voltage sensing circuit 322 develops the OVC signal in response to the reference voltage VREF. The voltage sensing circuit 322 includes an NMOS transistor 324, a diode-coupled NMOS transistor 326, and a current source 328 that operate in combination to develop a control signal 330 in response to the reference voltage VREF. More specifically, the transistor 324 adjusts the current through the diode-coupled transistor 326 in response to the reference voltage VREF to control the value of the control signal 330. The control signal 330 is applied to a gate of an NMOS transistor 332 that is coupled in series with a current source 334 between the supply voltage VCC and ground. In response to the control signal 330, the transistor 332 controls the value of the OVC signal applied to the transistor 318. Thus, the voltage sensing circuit 322 forms a feedback circuit that adjusts the value of the OVC signal in response to the reference voltage VREF to and thereby control the value of the reference voltage.

During normal operation of the voltage generation circuit 300, the oscillator 304 clocks the charge pump 306 which, in turn, charges a load capacitor 336 to develop the pumped voltage VCCP across the load capacitor. In response to the pumped voltage VCCP, the diode-coupled transistor 308 and current source 310 develop the control signal 312 that is applied to the transistor 314 which, in turn, develops the pump feedback voltage VPF applied to the Schmitt Trigger comparator 302. At the same time, the coupling circuit 315 and voltage sensing circuit 322 operate combination to develop the voltage reference VREF that is applied to the Schmitt Trigger comparator 302. During normal operation, the transistor 332 is turned OFF, causing the OVC signal to go to approximately the supply voltage VCC and turning ON the transistor 318. In this situation, the value of the reference voltage VREF is determined by a small voltage drop (less than the threshold voltage of the transistor 332) across the current source 328 plus the voltage drop across the diode-coupled transistor 326 plus the threshold voltage of the transistor 324.

In the normal operation mode, as long as the pump feedback voltage VPF is less than the reference voltage VREF, the Schmitt Trigger comparator 302 enables the oscillator 304 which, in turn, clocks the charge pump 306 so that the charge pump continues charging the capacitor 336 to increase the value of the pumped voltage VCCP. When the pumped voltage VCCP reaches a value causing the pump feedback voltage VPF to become greater than the reference voltage VREF, the Schmitt Trigger comparator 302 disables the oscillator 304 which, in turn, stops clocking the charge pump 306. At this point, capacitor 336 begins to discharge through a load resistance 337. When the voltage VPF once again becomes less than the reference voltage VREF the Schmitt Trigger comparator 302 activates the oscillator 304 to clock the charge pump 306 to charge the load capacitor 336 and increase the pumped voltage VCCP.

Figure 4:
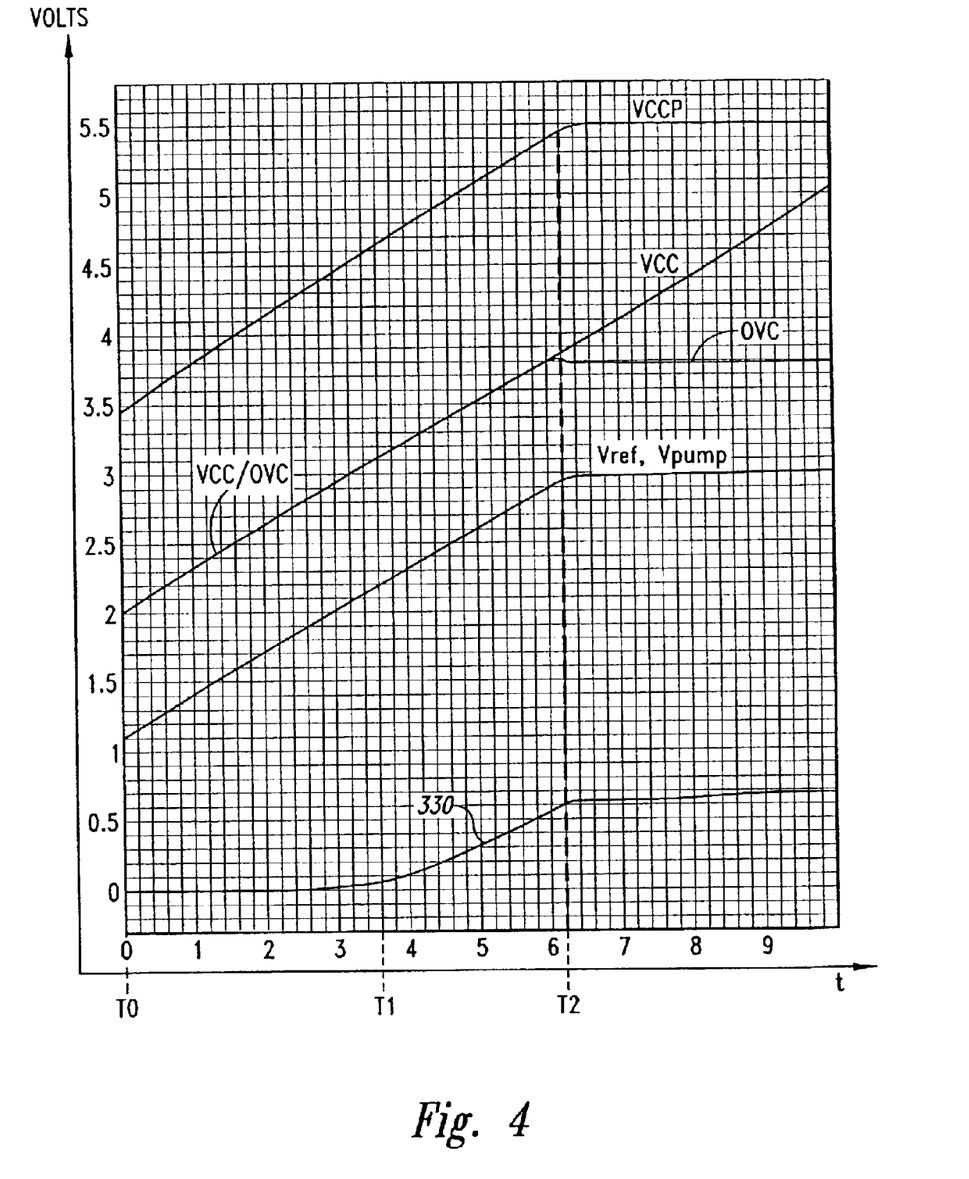
FIG. 4 is a graph illustrating the effect of an increasing supply voltage on an output voltage and several other signals in the voltage generation circuit of FIG. 3.

The operation of the voltage generation circuit 300 in an overvoltage mode, which occurs when the supply voltage VCC increases such as may occur during burn-in of an integrated circuit (not shown) containing the voltage generation circuit, will now be explained in more detail with reference to FIGS. 3 and 4. FIG. 4 illustrates the values for the pumped voltage VCCP, the supply voltage VCC, the overvoltage control signal OVC, the reference voltage VREF, and the control signal 330 during operation of the voltage generation circuit 300 in the overvoltage mode. Although not shown in FIG. 4 to simplify the figure, the pumped voltage VCCP has ripple due to the hysteresis of the Schmitt Trigger comparator 302. As will now be explained in more detail, during the overvoltage mode the coupling circuit 315 and voltage sensing circuit 322 operate in combination to the to limit the value of the pumped voltage VCCP. More specifically, as the supply voltage VCC increases, the voltage on the gate and drain of the diode-coupled transistor 317 increases, and this increased voltage is applied through the transistor 318 to increase of the reference voltage VREF. In response to the increased reference voltage VREF, the Schmitt Trigger comparator 302 activates the oscillator 304 which, in turn, causes the charge pump 306 to increase the pumped voltage VCCP until the pump feedback voltage VPF once again equals the increased reference voltage. In FIG. 4, at a time a T0 the supply voltage VCC begins increasing and the pumped voltage VCCP and reference voltage VREF likewise increase in response to the increasing supply voltage.

At a time a T1, the control signal 330 begins increasing from a value of approximately zero volts in response to the increasing reference voltage VREF and corresponding increase in current through the transistor 324, diode-coupled transistor 326, and current source 328. At this point, note that the overvoltage control signal OVC also increases and approximately equals the supply voltage VCC since the transistor 332 is turned OFF. The control signal 330 continues increasing along with the other signals until a time T2, when the magnitude of the control signal equals approximately the threshold voltage of the transistor 332. In response to the control signal 330, the transistor 332 turns ON at the time T2, causing current to flow through the current source 334 and the transistor and controlling the value of the overvoltage control signal OVC as illustrated in FIG. 4. When the value of the overvoltage signal OVC is limited at the time T2, the value of the reference voltage VREF is limited to the sum of the threshold voltages of transistors 324, 326, and 332. As a result, the increases in the supply voltage VCC no longer increase the reference voltage VREF. After the time T2, the pumped voltage VCCP no longer increases and is thus limited to prevent damage to components (not shown) in the integrated circuit (not shown) containing the voltage generation circuit 300. Moreover, the power consumption of the charge pump 306 does not increase after the time T2 notwithstanding further increases in the supply voltage VCC.

Figure 5:
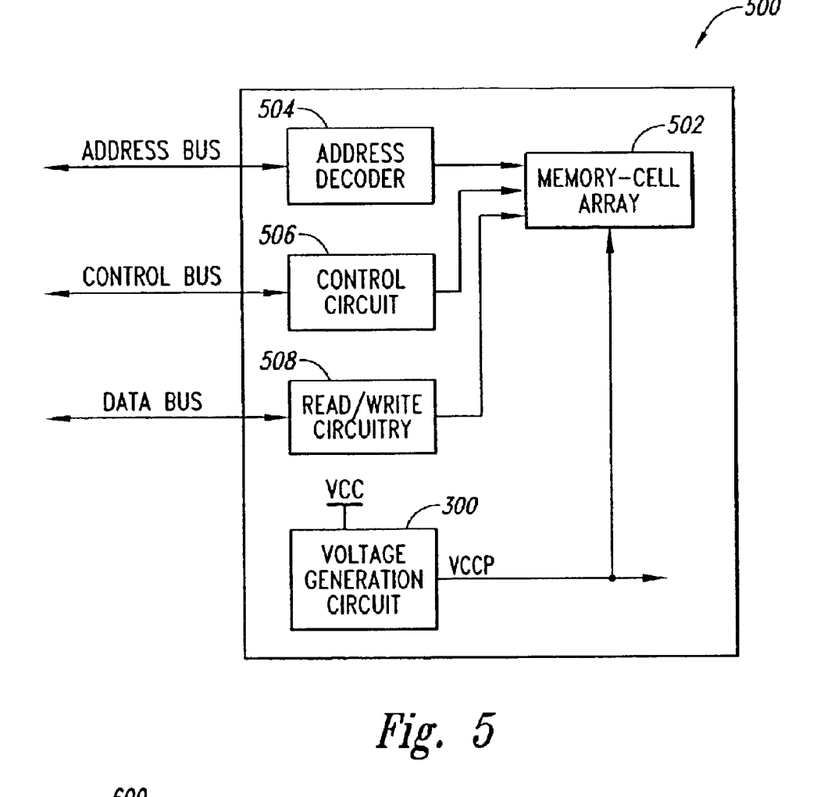
FIG. 5 is a functional block diagram of a memory device including the voltage generation circuit of FIG. 3.

FIG. 5 is a block diagram of a memory device 500 including the voltage generation circuit 300 of FIG. 3. The voltage generation circuit 300 applies the pumped voltage VCCP to a memory-cell array 502 contained in the memory device 500, and may also apply the pumped voltage to other components in the memory device. In the memory-cell array 502, the pumped voltage VCCP is applied, for example, to word lines (not shown) to access corresponding rows of memory cells (not shown), as will be understood by those skilled in the art. The memory device 500 further includes an address decoder 504, a control circuit 506, and read/write circuitry 508, all of which are conventional and known in the art. The address decoder 504, control circuit 506, and read/write circuitry 508 are all coupled to the memory-cell array 502. In addition, the address decoder 504 is coupled to an address bus, the control circuit 506 is coupled to a control bus, and the read/write circuitry 508 is coupled to a data bus.

In operation, external circuitry (not shown) provides address, control, and data signals on the respective busses to the memory device 500. During a read cycle, the external circuitry provides a memory address on the address bus and control signals on the control bus. In response to the memory address on the address bus, the address decoder 504 provides a decoded memory address to the memory-cell array 502 while the control circuit 506 provides control signals to the memory-cell array in response to the control signals on the control bus. The control signals from the control circuit 506 control the memory-cell array 502 to provide data to the read/write circuitry 508. The read/write circuitry 508 then provides this data on the data bus for use by the external circuitry. During a write cycle, the external circuitry provides a memory address on the address bus, control signals on the control bus, and data on the data bus. Once again, the address decoder 504 decodes the memory address on the address bus and provides a decoded address to the memory-cell array 502. The read/write circuitry 508 provides the data on the data bus to the memory-cell array 502 and this data is stored in the addressed memory cells in the memory-cell array under control of the control signals from the control circuit 506. The memory device 500 may be a dynamic random access memory (DRAM), synchronous DRAM (SDRAM), double-data-rate (DDR) DRAM, packetized memory device such as an SLDRAM or RAMBUS device, or other type of memory device as well. Moreover, the voltage generation circuit 300 may be placed integrated circuits other than memory devices.

Figure 6:
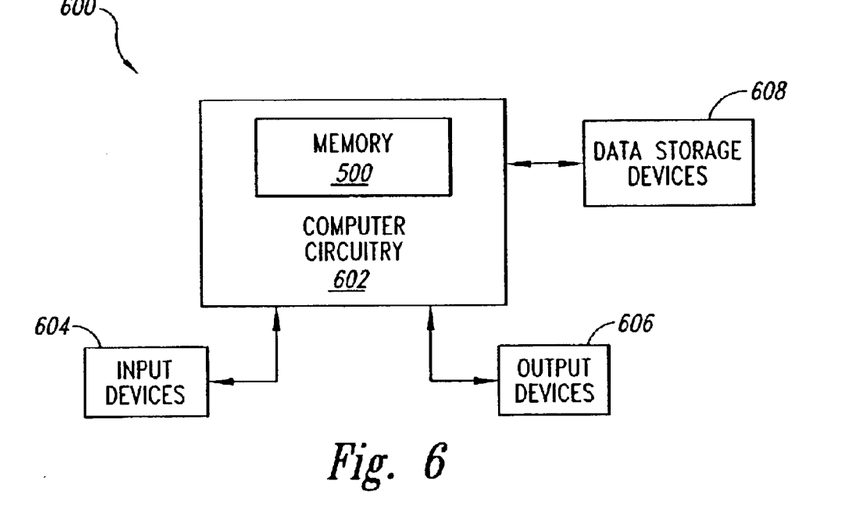
FIG. 6 is a functional block diagram of a computer system including the memory device of FIG. 5.

FIG. 6 is a block diagram of a computer system 600 which uses the memory device 500 of FIG. 5. The computer system 600 includes computer circuitry 602 for performing various computing functions, such as executing specific software to perform specific calculations or tasks. In addition, the computer system 600 includes one or more input devices 604, such as a keyboard or a mouse, coupled to the computer circuitry 602 to allow an operator to interface with the computer system. Typically, the computer system 600 also includes one or more output devices 606 coupled to the computer circuitry 602, such output devices typically being a printer or a video terminal. One or more data shortage devices 608 are also typically coupled to the computer circuitry 602 to store data or retrieve data from external storage media (not shown). Examples of typical data storage devices 608 include hard and floppy disks, tape cassettes, and compact disk read only memories (CD-ROMs). The computer circuitry 602 is typically coupled to the memory device 500 through a control bus, a data bus, and an address bus to provide for writing data to and reading data from the memory device.

It is to be understood that even though various embodiments and advantages of the present invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. Also, the conductivity types of the devices, such as NMOS and PMOS transistors, may also be varied as required by particular applications, as will be understood by those skilled in the art. Therefore, the present invention is to be limited only by the appended claims.

What is claimed is:

1. A memory device, comprising:

an address bus;

a control bus;

a data bus;

an address decoder coupled in the address bus;

a control circuit coupled to the control bus;

a read/write circuit coupled to the data bus;

a memory-cell array coupled to the address decoder, read/write circuit, and control circuit, the array having a plurality of memory cells arranged in rows and columns, each memory cell storing a bit of data; and a voltage generation circuit, including, a generator circuit adapted to receive a supply voltage and including a reference node, the generator circuit developing an output voltage from the supply voltage and the output voltage having a value that is a function of a reference voltage applied on the reference node;

a coupling circuit coupled to the reference node and adapted to receive the supply voltage, the coupling circuit being operable in response to a voltage control signal to vary an electronic coupling of the supply voltage to the reference node and thereby adjust the value of the reference voltage; and a voltage sensing circuit coupled to the reference node to receive the reference voltage and coupled to the coupling circuit, the voltage sensing circuit developing the voltage control signal responsive to the reference voltage.

2. The memory device of claim 1 wherein the memory device comprises a dynamic random access memory (DRAM) and the voltage generation circuit generates a pumped voltage VCCP that is applied to various components in the DRAM.

3. The memory device of claim 1 wherein the voltage sensing circuit comprises:

a first transistor having a first signal terminal coupled to source of the supply voltage and having a second signal terminal and a control terminal coupled to the reference node;

a level shifting circuit having a first terminal coupled to the second signal terminal of the first transistor and having a second signal terminal, the level shifting circuit developing a voltage on the second terminal having a value that s a function of the voltage on the first terminal;

a first current source coupled between the second terminal of the level shifting circuit and a common reference voltage source;

a second transistor having a control terminal coupled to the second terminal of the level shifting circuit and having a first signal terminal coupled to the common reference voltage source and having a second signal terminal on which the voltage control signal is developed; and a second current source coupled between the source of the supply voltage and the second signal terminal.

4. The voltage generation circuit of claim 1 wherein the coupling circuit reduces the electronic coupling of the supply voltage to the reference node responsive to a value of the voltage control signal increasing and increases the electronic coupling of the supply voltage to the reference node responsive to the value of the voltage control signal decreasing.

5. The voltage generation circuit of claim 2 wherein the coupling circuit comprises:

a level shifting circuit having a first terminal coupled to a source of the supply voltage and having a second terminal, the level shifting circuit developing a voltage on a second terminal having a value that is a function of the supply voltage;

a transistor having a first signal terminal coupled to the reference node and a second signal terminal coupled to the second terminal of the level shifting circuit, the transistor having a control terminal coupled to the voltage sensing circuit to receive the voltage control signal; and a current source coupled between the reference node and a common voltage reference source.

6. A memory device, comprising:
an address bus;
a control bus;
a data bus;
an address decoder coupled to the address bus;
a control circuit coupled to the control bus;
a read/write circuit coupled to the data bus;
a memory-cell array coupled to the address decoder, read/write circuit, and control circuit, the array having a plurality of memory cells arranged in rows and columns, each memory cell storing a bit of data; and a voltage generation circuit, including, a voltage pump circuit including a reference node and a pump feedback node, the voltage pump circuit developing on an output node an output voltage having a value that is a function of a reference voltage applied on the reference node and a feedback voltage on the feedback node;

a feedback circuit coupled between the output node kind the pump feedback node of the voltage pump circuit, the feedback circuit developing the pump feedback voltage in response to the output voltage;

a coupling circuit coupled to the reference node and being adapted to receive a supply voltage and a control signal, the coupling circuit operable in response the control signal to control the value of a current supplied from the supply voltage to control the value of the reference voltage; and a voltage sensing circuit coupled to the reference node to receive the reference voltage and coupled to the coupling circuit, the voltage sensing circuit developing the control signal responsive to the reference voltage.

7. The memory device of claim 6 wherein the voltage pump circuit develops as the output voltage a pumped output voltage having a value greater than the supply voltage.

8. The memory device of claim 6 wherein the voltage sensing circuit decreases a value of the control signal when the reference voltage increases and increases a value of the control signal when the reference voltage decreases.

9. The memory device of claim 8 wherein the voltage sensing circuit comprises:

a first transistor having a first signal terminal coupled to the supply voltage and having a second signal terminal and a control terminal coupled to the reference node;

a level shifting circuit having a first terminal coupled to the second signal terminal of the first transistor and having a second signal terminal, the level shifting circuit developing a voltage on the second terminal having a value that s a function of the voltage on the first terminal;

a first current source coupled between the second terminal of the level shifting circuit and a common reference voltage source;

a second transistor having a control terminal coupled to the second terminal of the level shifting circuit and having a first signal terminal coupled to the common reference voltage source and having a second signal terminal on which the voltage control signal is developed; and a second current source coupled between the source of the supply voltage and the second signal terminal.

10. The memory device of claim 6 wherein the coupling circuit increases the current responsive to a value of the control signal increasing and decreases the current responsive to the value of the control signal decreasing.

11. The memory device of claim 10 wherein the coupling circuit comprises:

a level shifting circuit having a first terminal coupled to a source of the supply voltage and having a second terminal, the level shifting circuit developing a voltage on a second terminal having a value that is a function of the supply voltage;

a transistor having a first signal terminal coupled to the reference node and a second signal terminal coupled to the second terminal of the level shifting circuit, the transistor having a control terminal coupled to the voltage sensing circuit to receive the control signal; and a current source coupled between the reference node and a common voltage reference source.

12. The memory device of claim 6 wherein the generator circuit further comprises:

a charge pump circuit that develops a pumped output voltage on an output responsive to a clock signal;

an oscillator circuit coupled to the charge pump, the oscillator developing a clock signal in response to an applied control signal being inactive and not developing the control signal in response to the applied control signal being inactive;

a feedback circuit coupled to the output of charge pump circuit to receive the pumped output voltage, the feedback circuit developing a pumped voltage having a value that is a function of the pumped output voltage; and a comparator circuit coupled to the oscillator circuit and having a first input coupled to the feedback circuit to receive the pump feedback voltage and a second input coupled to receive the reference voltage, the comparator circuit applying the active control signal to the oscillator circuit when the pump feedback voltage is less than the reference voltage and applying the inactive control signal to the oscillator when the pump feedback voltage is greater than the reference voltage.

13. The memory device of claim 6 wherein the memory device comprises a dynamic random access memory (DRAM) and the voltage generation circuit generates a pumped voltage VCCP that is applied to various components in the DRAM.

14. A memory device, comprising:

an address bus;

a control bus;

a data bus;

an address decoder coupled to the address bus;

a control circuit coupled to the control bus;

a read/write circuit coupled to the data bus;

a memory-cell array coupled to the address decoder, read/write circuit, and control circuit, the array having a plurality of memory cells arranged in rows and columns, each memory cell storing a bit of data; and a voltage generation circuit, including, a voltage pump circuit including a reference node and a pump feedback node, the voltage pump circuit developing on an output node an output voltage having a value that is a function of a reference voltage applied on the reference node and a feedback voltage on the feedback node;

a feedback circuit coupled between the output node and the pump feedback node of the voltage pump circuit, the feedback circuit developing the pump feedback voltage in response to the output voltage;

a coupling circuit coupled to the reference node and being adapted to receive a supply voltage and a control signal, the coupling circuit having a variable switch having a first signal terminal coupled to the reference node, a second signal terminal coupled to the supply voltage, and a control terminal coupled to the control signal, the variable switch operable in response to the control signal to control the value of a current supplied from the supply voltage to control the value of the reference voltage; and a voltage sensing circuit coupled to the reference node to receive the reference voltage and coupled to the coupling circuit, the voltage sensing circuit developing the control signal responsive to the reference voltage.

15. The memory device of claim 14 wherein the voltage pump circuit develops as the output voltage a pumped output voltage having a value greater than the supply voltage.

16. The memory device of claim 14 wherein the voltage sensing circuit decreases a value of the control signal when the reference voltage increases and increases a value of the control signal when the reference voltage decreases.

17. The memory device of claim 14 wherein the voltage sensing circuit comprises:

a first transistor having a first signal terminal coupled to the supply voltage and having a second signal terminal and a control terminal coupled to the reference node;

a level shifting circuit having a first terminal coupled to the second signal terminal of the first transistor and having a second signal terminal, the level shifting circuit developing a voltage on the second terminal having a value that s a function of the voltage on the first terminal;

a first current source coupled between the second terminal of the level shifting circuit and a common reference voltage source;

a second transistor having a control terminal coupled to the second terminal of the level shifting circuit and having a first signal terminal coupled to the common reference voltage source and having a second signal terminal on which the voltage control signal is developed; and a second current source coupled between the source of the supply voltage and the second signal terminal.

18. The memory device of claim 14 wherein the coupling circuit increases the current responsive to a value of the control signal increasing and decreases the current responsive to the value of the control signal decreasing.

19. The memory device of claim 18 wherein the coupling circuit comprises:

a level shifting circuit having a first terminal coupled to a source of the supply voltage and having a second terminal coupled to the second signal terminal of the variable switch, the level shifting circuit developing a voltage on a second terminal having a value that is a function of the supply voltage; and a current source coupled between the reference node and a common voltage reference source.

20. The memory device of claim 14 wherein the generator circuit further comprises:

a charge pump circuit that develops a pumped output voltage on an output responsive to a clock signal;

an oscillator circuit coupled to the charge pump, the oscillator developing a clock signal in response to an applied control signal being active and not developing the control signal in response to the applied control signal being inactive;

a feedback circuit coupled to the output of charge pump circuit to receive the pumped output voltage, the feedback circuit developing a pumped voltage having a value that is a function of the pumped output voltage, and a comparator circuit coupled to the oscillator circuit and having a first input coupled to the feedback circuit to receive the pump feedback voltage and a second input coupled to receive the reference voltage, the comparator circuit applying the active control signal to the oscillator circuit when the pump feedback voltage is less than the reference voltage and applying the inactive control signal to the oscillator when the pump feedback voltage is greater than the reference voltage.

21. The memory device of claim 14 wherein the memory device comprises a dynamic random access memory (DRAM) and the voltage generation circuit generates a pumped voltage VCCP that is applied to various components in the DRAM.

22. A memory device, comprising:
an address bus;
a control bus;
a data bits;
an address decoder coupled to the address bus;
a control circuit coupled to the control bus;
a read/write circuit coupled to the data bits;
a memory-cell array coupled to the address decoder, read/write circuit, and control circuit, the array having a plurality of memory cells arranged in rows and columns, each memory cell storing a bit of data; and
a voltage generation circuit, including,
  a generator circuit adapted to receive a supply voltage and including a reference node, the generator circuit developing an output voltage from the supply voltage and the output voltage having a value that is a function of a reference voltage applied on the reference node;
  a coupling circuit coupled to the reference node and adapted to receive the supply voltage, the coupling circuit having a variable switch having a first signal terminal coupled to the reference node, a second signal terminal coupled to the supply voltage, and a control terminal, the variable switch being operable in response to a voltage control signal applied to the control terminal to vary an electronic coupling of the supply voltage to the reference node and thereby adjust the value of the reference voltage; and
  a voltage sensing circuit coupled to the reference node to receive the reference voltage and coupled to the coupling circuit, the voltage sensing circuit developing the voltage control signal responsive to the reference voltage.

23. The memory device of claim 22 wherein the memory device comprises a dynamic random access memory (DRAM) and the voltage generation circuit generates a pumped voltage VCCP that is applied to various components in the DRAM.

24. The memory device of claim 22 wherein the generator circuit develops as the output voltage a pumped output voltage having a value greater than the supply voltage.

25. The memory device or claim 22 wherein the voltage sensing circuit decreases a value of the voltage control signal when the reference voltage increases and increases a value of the voltage control signal when the reference voltage decreases.

26. The memory device of claim 25 wherein the voltage sensing circuit comprises:
a first transistor having a first signal terminal coupled to source of the supply voltage and having a second signal terminal and a control terminal coupled to the reference node;
a level shifting circuit having a first terminal coupled to the second signal terminal of the first transistor and having a second signal terminal, the level shifting circuit developing a voltage on the second terminal having a value that s a function of the voltage on the first terminal;
a first current source coupled between the second terminal of the level shifting circuit and a common reference voltage source;
a second transistor having a control terminal coupled to the second terminal of the level shifting circuit and having a first signal terminal coupled to the common reference voltage source and having a second signal terminal on which the voltage control signal is developed; and
a second current source coupled between the source of the supply voltage and the second signal terminal.

27. The memory device of claim 22 wherein the coupling circuit reduces the electronic coupling of the supply voltage to the reference node responsive to a value of the voltage control signal increasing and increases the electronic coupling of the supply voltage to the reference node responsive to the value of the voltage control signal decreasing.

28. The memory device of claim 27 wherein the coupling circuit comprises:
a level shifting circuit having a first terminal coupled to a source of the supply voltage and having a second terminal coupled to the second signal terminal of the variable switch, the level shifting circuit developing a voltage on a second terminal having a value that is a function of the supply voltage; and
a current source coupled between the reference node and a common voltage reference source.

29. The memory device of claim 22 wherein the generator circuit further comprises:
a charge pump circuit that develops a pumped output voltage on an output responsive to a clock signal;
an oscillator circuit coupled to the charge pump, the oscillator developing a clock signal in response to an applied control signal being active and not developing the control signal in response to the applied control signal being inactive;
a feedback circuit coupled to the output of charge pump circuit to receive the pumped output voltage, the feedback circuit developing a pumped voltage having a value that is a function of the pumped output voltage; and
a comparator circuit coupled to the oscillator circuit and having a first input coupled to the feedback circuit to receive the pumped voltage and a second input adapted to receive the reference voltage, the comparator circuit applying the active control signal to the oscillator circuit when the pumped voltage is less than the reference voltage and applying the inactive control signal to the oscillator when the pumped voltage is greater than the reference voltage.

30. A memory device, comprising:
an address bus;
a control bus;
a data bus;
an address decoder coupled to the address bus;
a control circuit coupled to the control bus;
a read/write circuit coupled to the data bus;
a memory-cell array coupled to the address decoder, read/write circuit, and control circuit, the array having a plurality of memory cells arranged in rows and columns, each memory cell storing a bit of data; and a voltage generation circuit, including,
  means for developing an output voltage from a supply voltage, the output voltage having a value that is a function of a reference voltage on a reference node;
  means for varying an electronic coupling of the supply voltage to the reference node in response to a voltage control signal; and
  means for developing the voltage control signal responsive to the reference voltage.

31. The memory device of claim 1 wherein the memory device comprises a dynamic random access memory (DRAM) and the voltage generation circuit generates a pumped voltage VCCP that is applied to various components in the DRAM.

32. The memory device of claim 30 wherein the means for varying an electronic coupling reduces the electronic coupling of the supply voltage to the reference node responsive to a value of the voltage control signal increasing, and increases the electronic coupling of the supply voltage to the reference node responsive to the value of the voltage control signal decreasing.

33. A memory device, comprising:
  an address bus;
  a control bus;
  a data bus;
  an address decoder coupled to the address bus, a control circuit coupled to the control bus;
  a read/write circuit coupled to the data bus;
  a memory-cell array coupled to the address decoder, read/write circuit, and control circuit, the array having a plurality of memory cells arranged in rows and columns, each memory cell storing a bit of data; and
  a voltage generation circuit, including,
    means for developing an output voltage having a value that is a function of a reference voltage and a feedback voltage;
    means for developing the pump feedback voltage in response to the output voltage;
    means for controlling the value of a current supplied from the supply voltage to control the value of the reference voltage responsive to the control signal; and
    means for developing the control signal responsive to the reference voltage.

34. The memory device of claim 33 wherein the output voltage has a value greater than the supply voltage.

35. The memory device of claim 33 wherein the means for developing the control signal decreases a value of the control signal when the reference voltage increases and increases a value of the control signal when the reference voltage decreases.

36. The memory device of claim 33 wherein the memory device comprises a dynamic random access memory (DRAM) and the voltage generation circuit generates a pumped voltage VCCP that is applied to various components in the DRAM.

* * * * *

UNITED STATES PATENT AND TRADEMARK OFFICE
CERTIFICATE OF CORRECTION

PATENT NO.      : 6,750,639 B2
DATED           : June 15, 2004
INVENTOR(S)     : Ronnie M. Harrison It is certified that error appears in the above-identified patent and that said Letters Patent is hereby corrected as shown below:

Column 6,
Line 57, reads "combination to the to limit" should read -- combination to limit --
Line 61, reads "318 to increase of the" should read -- 318 to increase the --
Line 67, reads "at a time a T0" should read -- at a time T0 --

Column 7,
Line 4, reads "At a time a T1" should read -- At a time T1 --

Column 8,
Line 8, reads "may be placed integrated" should read -- may be placed on integrated --

Column 9,
Lines 17-18, reads "coupled to source of the" should read -- coupled to a source of the --
Line 25, reads "a value that s a function" should read -- a value that is a function --

Column 10,
Line 9, reads "an output node an" should read -- an output node, an --
Line 14, reads "kind the pump" should read -- and the pump --
Line 20, reads "response the control" should read -- response to the control --
Line 44, reads "a value that s a function" should read -- a value that is a function --

Column 12,
Line 15, reads "device of claim 14" should read -- device of claim 16 --
Line 24, reads "a value that s a function" should read -- a value that is a function --

Column 13,
Line 20, reads "to the data bits" should read -- to the data bus --
Line 55, reads "device or claim 22" should read -- device of claim 22 --

Column 14,
Line 3, reads "a value that s a function" should read -- a value that is a function --

UNITED STATES PATENT AND TRADEMARK OFFICE
CERTIFICATE OF CORRECTION

PATENT NO. : 6,750,639 B2
DATED : June 15, 2004
INVENTOR(S) : Ronnie M. Harrison It is certified that error appears in the above-identified patent and that said Letters Patent is hereby corrected as shown below:

Column 15,
Lines 27-28, reads "address bus a control circuit" should read -- address bus; a control circuit --

Signed and Sealed this

Second Day of August, 2005

JON W. DUDAS
*Director of the United States Patent and Trademark Office*